United States Patent
Bakaj et al.

(10) Patent No.: US 7,866,144 B2
(45) Date of Patent: Jan. 11, 2011

(54) ARRANGEMENT FOR THE DOSED INJECTION OF A REDUCING MEDIUM INTO THE EXHAUST TRACT OF AN INTERNAL COMBUSTION ENGINE

(75) Inventors: Leo Bakaj, Fellbach (DE); Wilhelm Malitsky, Ilsfeld-Helfenberg (DE)

(73) Assignee: L'Orange GmbH, Stuttgart (DE)

( * ) Notice: Subject to any disclaimer, the term of this patent is extended or adjusted under 35 U.S.C. 154(b) by 942 days.

(21) Appl. No.: 11/787,012

(22) Filed: Apr. 13, 2007

(65) Prior Publication Data

US 2007/0186543 A1  Aug. 16, 2007

Related U.S. Application Data

(63) Continuation-in-part of application No. PCT/EP2005/010815, filed on Jul. 10, 2005.

(30) Foreign Application Priority Data

Oct. 13, 2004 (DE) ............ 10 2004 050 023

(51) Int. Cl.
*F01N 3/00* (2006.01)
(52) U.S. Cl. ............ 60/286; 60/295; 60/297; 60/303; 239/88; 239/90
(58) Field of Classification Search ........ 60/274, 60/285, 286, 295, 297, 303; 239/88, 89, 239/90
See application file for complete search history.

(56) References Cited

U.S. PATENT DOCUMENTS

| 3,635,403 | A  | * | 1/1972 | Hofken et al. ........ 239/90 |
| 3,868,819 | A  | * | 3/1975 | Knapp ........... 60/276 |
| 6,203,770 | B1 |   | 3/2001 | Hoblyn, Jr. |
| 6,848,251 | B2 | * | 2/2005 | Ripper et al. ........ 60/286 |
| 7,000,381 | B2 | * | 2/2006 | Maisch ........ 60/286 |
| 7,454,898 | B2 | * | 11/2008 | Allgeier et al. ........ 60/286 |
| 7,475,533 | B2 | * | 1/2009 | Hirata et al. ........ 60/275 |
| 7,571,603 | B2 | * | 8/2009 | Ripper et al. ........ 60/286 |
| 2004/0093856 | A1 |   | 5/2004 | Dingle |

FOREIGN PATENT DOCUMENTS

DE  101 29 592  2/2002

\* cited by examiner

*Primary Examiner*—Binh Q Tran
(74) *Attorney, Agent, or Firm*—Klaus J. Bach

(57) ABSTRACT

In an arrangement for the dosed injection of a reducing agent into the exhaust tract of an internal combustion engine, comprising a pump for the pulsed pumping of the reducing agent and an atomizing injection nozzle disposed in the exhaust tract of the internal combustion engine, the injection nozzle includes a valve element which opens and closes the injection nozzle depending on the pressure generated by the pump and permits the injection of the reducing agent into the exhaust tract only when the pressure of the reducing agent is in excess of a certain value in order to ensure proper atomization of any reducing agent injected into the exhaust tract.

10 Claims, 3 Drawing Sheets

ARRANGEMENT FOR THE DOSED INJECTION OF A REDUCING MEDIUM INTO THE EXHAUST TRACT OF AN INTERNAL COMBUSTION ENGINE

This is a Continuation-In-Part Application of pending International patent application PCT/EP2005/010815 filed Jul. 10, 2005 and claiming the priority of German patent application 10 2004 050 023.1 filed Oct. 13, 2004.

BACKGROUND OF THE INVENTION

The invention relates to an arrangement for the dosed injection of a reducing agent into the exhaust tract of an internal combustion engine, particularly of a diesel engine, using for example a piston pump for the pulsed delivery of the reducing agent to a nozzle extending into the exhaust tract of the engine.

It is known to reduce the nitrogen oxide in the exhaust gas of internal combustion engines, particularly diesel engines, by selective catalytic reduction. To this end, an aqueous urea solution is injected into the exhaust tract finely atomized and in a dosed manner. For pressurizing the reducing agent generally a pump is used which supplies the reduction agent to a nozzle via which the reduction agent is injected into the exhaust tract.

US 2004/0093856 A1 discloses a dosing arrangement for reducing agents, which utilizes a piston pump. The pump includes a suction connection, which is in communication with a storage container for the reducing agent, and a pressure connection which is in communication with an atomizing device. The atomizing device extends into the exhaust tract of an internal combustion engine in the area of a Denox catalytic converter. For controlling the supply volume, the frequency or the pulse width is varied. To this end, a control device is used which, dependent on the engine operation, adjusts the energizing current for the pump in a suitable manner. The design of the nozzle is not shown. But it is assumed that the nozzle includes, as is common, one or several openings which are always open. With such a nozzle, a uniform atomization over the whole operating range cannot be achieved with varying injection volumes.

EP 1 380 733 A2 discloses a piston pump for the dosing of aqueous urea solutions including a piston which is operated by a piezo element. The piezo element can be operated at a frequency of from 0 to several hundred Hertz by stepless control. The nozzle for the injection of the reducing agent into the exhaust gas tract of an internal combustion engine apparently includes a diaphragm-like restriction which is always open. A uniform atomization over the whole operating range cannot be achieved with such a nozzle if the injection volume changes.

Another device for dosing the reducing agent injection into the exhaust tract of an internal combustion engine is known from DE 101 39 139 A1. A pump is used therein to pump the reducing agent by controlling an electric pump drive. The control unit also controls the operation of a dosing valve integrated into a dosing arrangement. It is further said that, in place of a dosing pump, a simple pump in connection with a pressure control valve could be used for controlling the admission volume. Also in this variant, the dosing of the injection amount obviously occurs by means of a dosing valve. The arrangement appears to be expensive since the pumping and the dosing involves different components which need to be controlled separately.

DE 22 49 291 discloses a method for airless paint spraying which however should be of no importance in considering the inventive level of the present invention since such a device is not concerned with a related field. Nevertheless, in this publication, a pulsing membrane pump is used for supplying paint to an atomizing nozzle, which is in the form of a blocking valve similar to an over-pressure valve. The blocking valve automatically opens and closes periodically in such a way that during a pressurizing period the paint supply is interrupted in the low pressure range, so that atomization occurs exclusively in the high-pressure range. Herein, only the pressure peaks are utilized for the atomization which provide for the finest atomization.

It is the object of the present invention to provide an arrangement for the injection of a reducing agent into the exhaust tract of an internal combustion engine with a high atomizing quality independently of pumping or injection volume using simple and inexpensive equipment.

SUMMARY OF THE INVENTION

In an arrangement for the dosed injection of a reducing agent into the exhaust tract of an internal combustion engine, comprising a pump for the pulsed pumping of the reducing agent and an atomizing injection nozzle disposed in the exhaust tract of the internal combustion engine, the injection nozzle includes a valve element which opens and closes the injection nozzle depending on the pressure generated by the pump and permits the injection of the reducing agent into the exhaust tract only when the pressure of the reducing agent is in excess of a certain value in order to ensure proper atomization of any reducing agent injected into the exhaust tract.

The apparatus is simple and inexpensive because the dosing and pumping of the reducing agent occurs solely by the pump whereas the valve element opening and closing, which occurs with the pumping tact, has the sole function to provide for optimal atomization.

Expediently, the valve element of the nozzle is slidably guided in a housing, is spring biased toward its blocking position on a valve element seat and can be opened by the pressurized fluid acting on pressure-exposed surfaces of the valve element against the force of the spring.

Furthermore, the atomization quality is improved in that the high-pressure line which is in communication with the high pressure pump outlet is in communication, via a pressure release line including a pressure release arrangement, with the pump operating chamber. In this way, the pressure can be suddenly reduced when the pressure in the pump operating chamber drops below a predetermined value, particularly below the pressure in the high pressure line. "Suddenly" means that the pressure curve drops in the decreasing range steeper than without pressure release arrangement. This is advantageous in that the area of the instable force equilibrium at the valve element is rapidly passed during the closing of the valve so that an undesirable dripping of reducing agent into the exhaust tract is suppressed.

Below, an embodiment of the invention will be described in greater detail with reference to the accompanying drawings.

DESCRIPTION OF PREFERRED EMBODIMENTS

Figure 1:
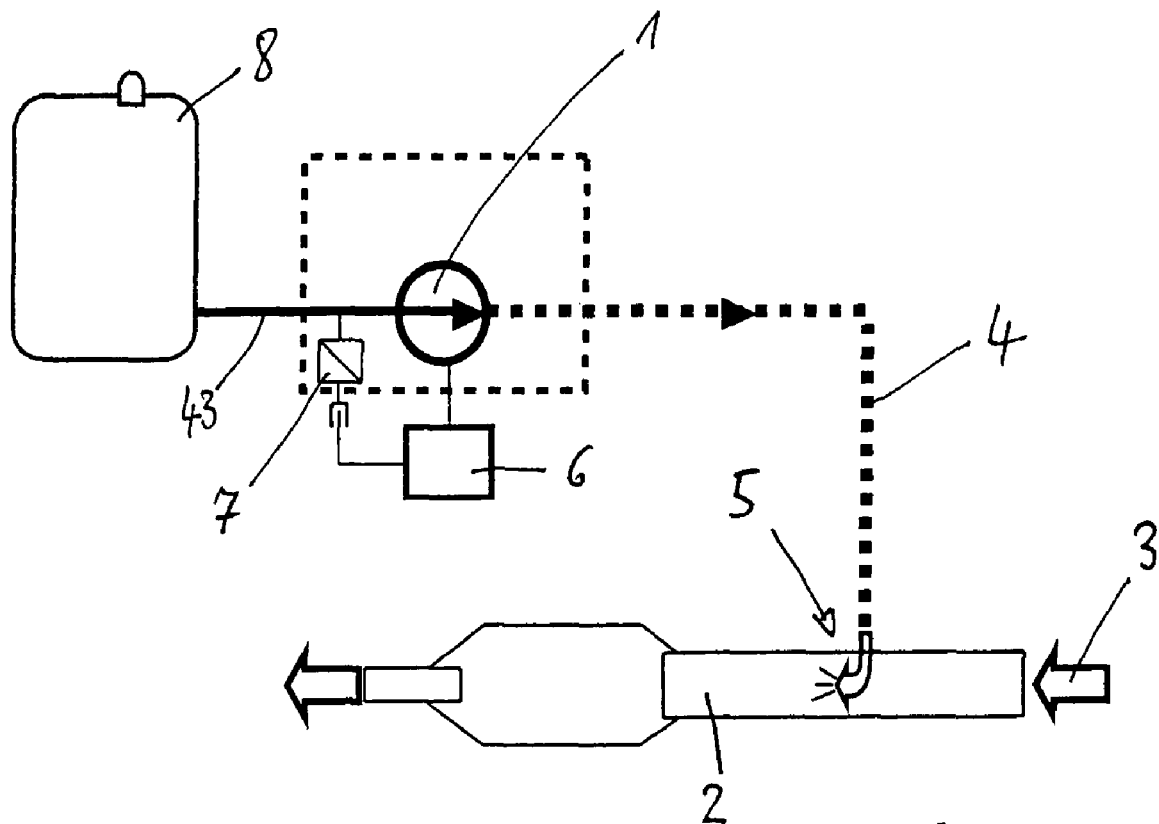
FIG. 1 shows schematically the components of an arrangement according to the invention for dosing urea.
Figure 3:
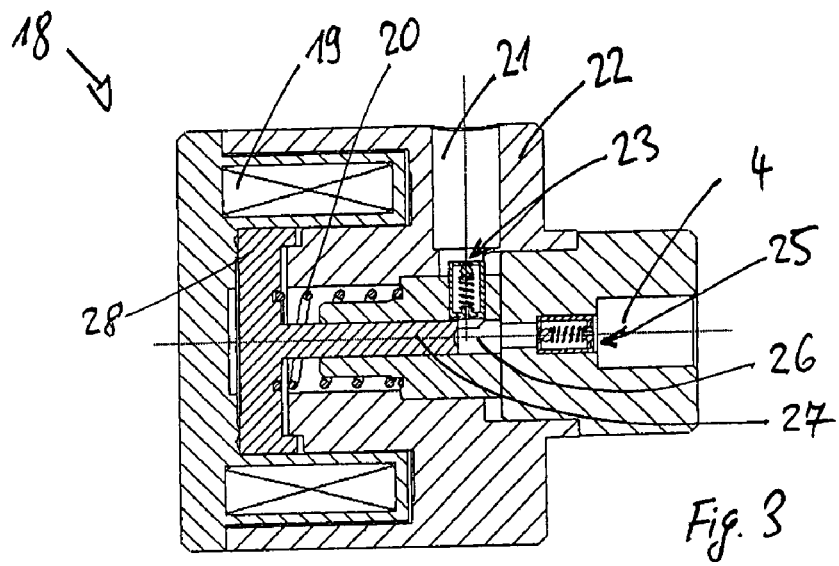
FIG. 3 is a cross-sectional view of a piston pump.
Figure 4:
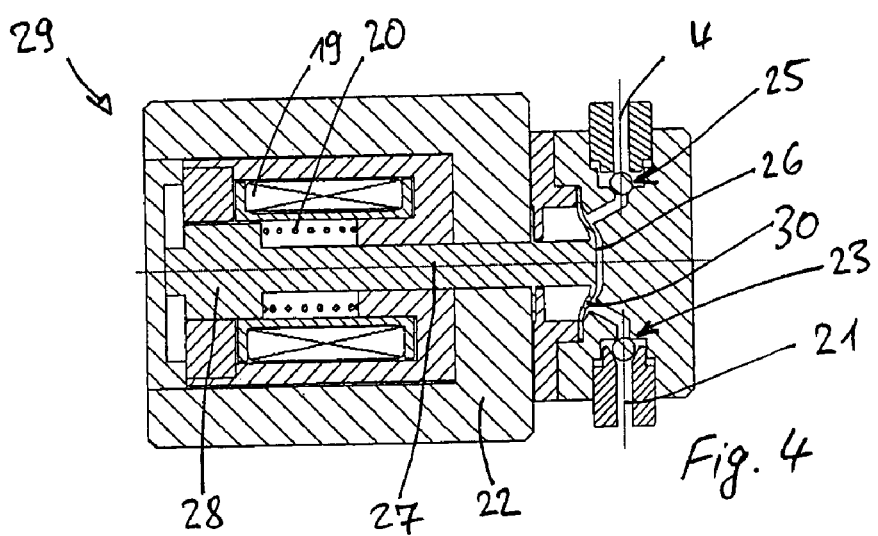
FIG. 4 is a cross-sectional view of a diaphragm pump.

FIG. 1 shows schematically an arrangement for the dosed injection of a reducing agent. A pump 1 takes reducing agent 1 from a storage container 8 and pumps it via a high pressure line 4 and a nozzle 5 into an exhaust tract 2 through which the exhaust gas of an internal combustion engine which is not shown flows. The pump 1 is a piston pump 18 as shown in FIG. 3 or a membrane pump 29 as shown in FIG. 4. The pump 1 is a pumping unit and, at the same time, a dosing device. The nozzle 5 which is shown in detail in FIG. 5 has no dosing function but only serves to set the pressure level at which the reducing agent is injected. The pump 1 is controlled by a control unit which, depending on exhaust gas values and/or engine operating parameters, changes the operating frequency of the pump 1 and, as a result, the pumping volume while the pump stroke remains constant. To this end, a coil 19 cooperating with a magnet armature 28 is energized by corresponding current pulses. A temperature sensor 7 is provided for taking the temperature of the reducing agent into account in the control unit 6.

Figure 2:
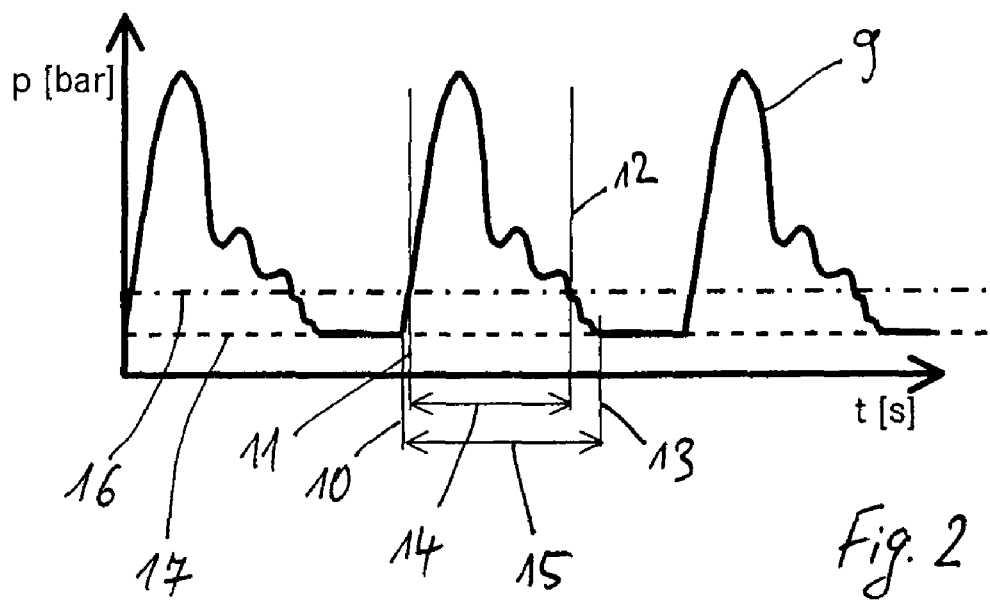
FIG. 2 shows a diagram showing the pressure of the reducing agent in the high pressure line pressurized by a reducing agent pump.

The diagram shown in FIG. 2 shows the pressure curve 9 for three pressure impulses as they occur in the high pressure line 4 ahead of the nozzle 5. At the point in time 10, the pumping process of the pump 1 begins, that is, the piston 27 or the membrane 30 of the pump 1 begins to move and the pressure in the high pressure line 4 increases. At the point in time 11, the valve element 33 of the nozzle 5 opens and the injection begins. At the point in time 12, the valve element 33 of the nozzle 5 closes. At the time 13, the intake valve of the pump 1 closes. In the decreasing range of the pressure curve 9, a pressure release system is effective which is shown more clearly in the FIGS. 6 to 8. The diagram further shows the nozzle opening time 14 and the duration 15 of the piston or membrane pump stroke. The dash-dotted line 16 indicates the pressure level at which the nozzle 5 opens or, respectively, closes. The dashed line 17 indicates the pressure level at which the suction valve 23 of the pump 1 closes, or, respectively, the pressure valve 25 opens. The injection occurs at pressures above the dash-dotted line; no injection occurs at pressures below the dash-dotted line. In this way, it is ensured that the atomization takes place only at a pressure which is sufficiently high to provide for fine atomization which is required for an optimal chemical conversion of the nitrogen oxides in the engine exhaust tract.

FIGS. 3 and 4 show a piston pump 18 or, respectively, a membrane pump 29 of essentially conventional design. Such simple constant stroke pumps can be used in connection with the dosing system according to the invention without further modifications. The pumps are electrically controlled and include an armature 28 and a coil 19, which is energized by an electric current. A return spring 20 is provided for returning the armature to its initial position. Upon energization of the coil 19, the piston 27 or, respectively, the membrane 30 are displaced so as to reduce the volume of the pump operating chamber 26, whereby the pressure of the reducing agent sucked via the suction inlet 21 and the check valve 23 into the operating chamber 26 is increased. The reducing agent is discharged from the pump into the high pressure line 4 via the high pressure connection 24 and the check valve 25. The various components are all disposed in a housing 22 in which the armature is guided and the pressure chambers are formed. A more detailed explanation of the operation of such pumps is not necessary since such pumps are well known.

Figure 5:
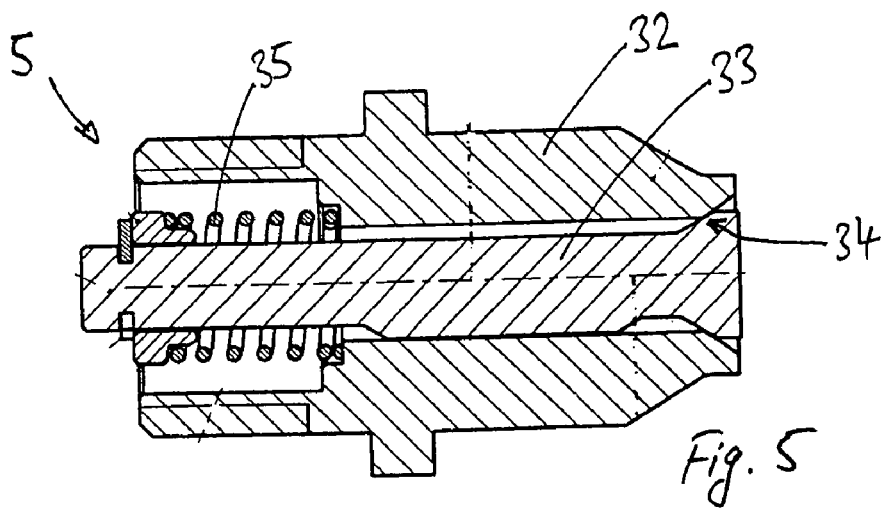
FIG. 5 is a cross-sectional view of an injection nozzle.

A nozzle 5 as used in connection with the dosing system according to the invention is shown in FIG. 5. It comprises a housing 32 in which a valve element 33 is movably guided. The valve element 33 is provided with a plate-like rim which, together with the housing 32, forms a seal seat 34. A closing spring 35, which is supported on the housing 32 and the valve element 33, biases the valve element 33 into its closed position. When the force generated by the pressure effective on the surfaces of the valve element 33 exceeds the force of the closing spring, the valve element 33 is lifted off the seal seat 34 and reducing agent is injected into the exhaust tract 2 of the internal combustion engine. The nozzle 5 is designed with respect to the surfaces subjected to the pressure and the closing spring 35 such that the reducing agent injection takes place only above a predetermined minimum pressure. The dosing pump operates intermittently. As a result, properly atomized injection amounts can be provided with small as well as large pumping volumes.

Figure 6:
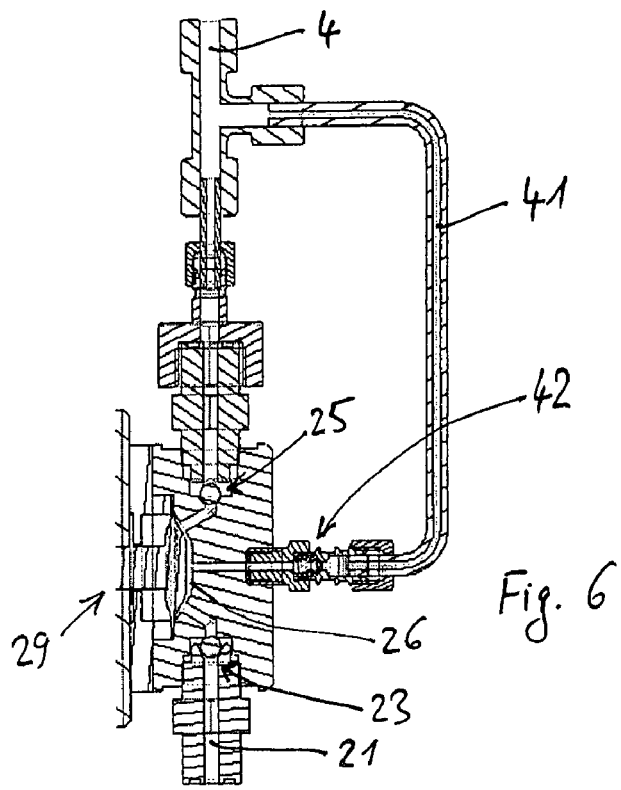
FIG. 6 is a cross-sectional view of a pressure release line included in a pressure release arrangement which line provides for communication between the operating space of the pump and the high pressure line.
Figure 7:
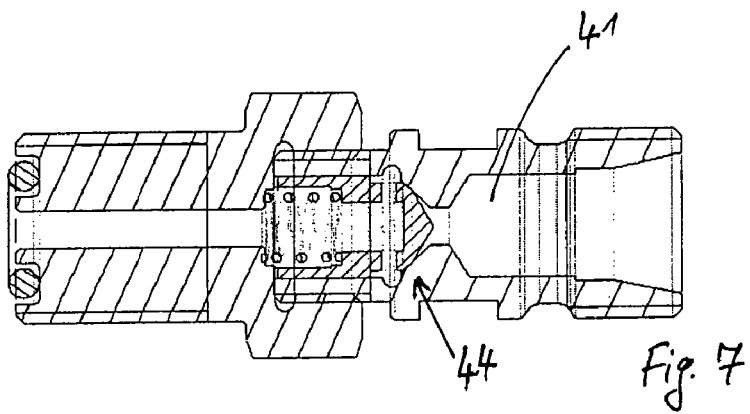
FIG. 7 shows a pressure release arrangement in the form of a check valve in a cross-sectional view.
Figure 8:
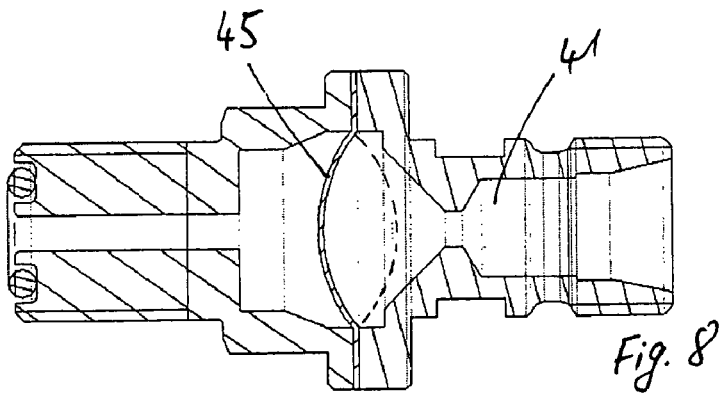
FIG. 8 is a cross-sectional view of a pressure release arrangement including a membrane.

FIG. 6 shows a pressure relief arrangement 42, which is arranged in a pressure release line 41. The pressure release line 41 is connected to the high pressure line 4 and the pump operating chamber 26. As shown in FIG. 7, the pressure relief arrangement 42 may have the form of a check valve 44 as shown in FIG. 8 or it may be in the form of a membrane 45 as shown in FIG. 8, wherein the membrane 45 may assume differently curved positions for displacing a volume delimited by the membrane 45. The check valve 44 includes a valve member which can be displaced toward the pump operating chamber for permitting a return flow of reducing agent. With the pressure relief arrangement 42, an automatic displacement of a volume out of the high pressure line 4 toward the pump operating chamber 26 is facilitated and, as a result, after closing of the nozzle 5, a sudden pressure reduction in the high pressure line 4 is achieved. The pressure release occurs when the pressure in the pump operating chamber 26 drops below the pressure in the high pressure line 4. This is the case when the pumping stroke of the pump 1 has ended and the suction stroke begins. Then the pressure in the high pressure line 4 exceeds the pressure in the pump operating chamber 26 and the check valve 44 opens or, respectively, the membrane 45 assumes the curved position as shown in FIG. 8. The pressure in the high pressure line 4 then drops to a residual pressure at which, in the case of the check valve 44, the spring force exceeds the resulting pressure force and closes the valve. The residual pressure depends on the dimensions of the area exposed to the pressure and the rigidity of the spring. The pressure relief arrangement 42 results in a rapid decrease of the pressure at the end of the pumping stroke and a sudden pressure relief in the high pressure line 4. This has the advantage that the valve element 33 of the injection nozzle 5 is subjected, in comparison with a system without pressure relief, to a shortened switch-over of the force equilibrium phase to a rapidly and firmly closed state of the valve element 33 so that after-drippings of reducing agent into the exhaust gas tract 2 are substantially avoided. Overall, therefore a fine atomization of the reducing agent independently of the injection volume is achieved over the whole operating range because pressure ranges which are unfavorable with respect to the atomization are eliminated during the injection or are at least rapidly passed over.

What is claimed is:

1. An arrangement for the dosed injection of a reducing medium, into an exhaust tract (2) of an internal combustion engine, comprising: a pump (1) for the pulsed pumping of the reducing medium, an injection nozzle (5) arranged in the exhaust tract (2) and disposed in communication with the pump (1) for injecting the reducing medium into the exhaust tract, the injection nozzle (5) including a valve element (33) which automatically opens and closes the injection nozzle (5) depending on the pressure generated by the pump (1) periodically and which permits injection of the reducing medium into the exhaust tract (2) only when the pressure of the reducing medium is in excess of a certain value so that atomization of the reducing medium takes place only when the reducing medium is pressurized to a degree exceeding the certain pressure, the pump (1) including an operating chamber (26) which is in communication with a storage container (8) via a suction line (43) and a check valve (23) and with the injection nozzle (5) via a high pressure line (4) and a check valve (25), a pressure relief line (41) extending between the high pressure line (4) downstream of the check valve (25) and a pressure relief arrangement (42) which is in communication with the pump operating chamber (26), the pressure relief arrangement (42) providing, during the suction stroke of the pump (1), for a displacement of a volume from the high pressure line (4) toward the pump operating chamber (26) for rapidly reducing the pressure in the high pressure line (4) and the injection nozzle (5).

2. The arrangement according to claim 1, wherein the pump (1) has a constant pumping stroke and, for the dosing of the reducing medium, the pumping stroke frequency is adjustable by electric control of the pump depending on engine parameters and exhaust gas composition.

3. The arrangement according to claim 1, wherein the valve element (33) of the nozzle (5) is slidably supported in a housing (12) which includes a seal seat (34) and a spring (35) is provided biasing the valve element (3) in sealing engagement with the seal seat (34) in a direction opposite to the pressure effective on the sealing element (33) by the pressureized reducing medium.

4. The arrangement according to claim 3, wherein the valve element (33) opens in the flow direction of the reducing medium through the valve (5) and the seal seat (34) is annular and formed between the housing (33) and a rim of the valve element (33).

5. The arrangement according to claim 1, wherein the pressure relief in the high pressure line occurs when pressure in the pump operating chamber (4) drops below the pressure in the high pressure line (4).

6. The arrangement according to claim 1, wherein the pressure relief arrangement (42) includes a one-way valve (44) opening in the direction of the pump operating chamber (26).

7. The arrangement according to claim 1, wherein the pressure relief arrangement (42) includes a membrane (45) which, depending on the pressure difference thereacross, is movable into oppositely curved positions providing for a displacement of the volumes at opposite side of the membrane (45).

8. The arrangement according to claim 1, wherein the reducing medium is an aqueous urea solution.

9. The arrangement according to claim 1, wherein the pump (1) is a piston pump.

10. The arrangement according to claim 1, wherein the pump (1) is a membrane pump.

* * * * *